Dec. 8, 1964  C. L. GRAND  3,160,042

JAW HOLDING DEVICE

Filed April 18, 1962

INVENTOR
CURTIS L. GRAND
BY
Williamson & Palmatier
ATTORNEYS though 3,160,042
Patented Dec. 8, 1964

3,160,042
JAW HOLDING DEVICE
Curtis L. Grand, Minneapolis, Minn., assignor to Nu-Line Industries, Inc., Minneapolis, Minn., a corporation of Minnesota
Filed Apr. 18, 1962, Ser. No. 188,404
6 Claims. (Cl. 82—34)

This invention relates to apparatus for positioning and holding jaws of a lathe chuck or of a collet to facilitate forming of the jaws to the proper curvature for holding a workpiece.

When reusable soft jaws, formed of a material such as mild steel that may be machined, are to be turned to precisely fit the cylindrical configuration of a workpiece, it is desirable that the jaws be positively fixed in a predetermined position. In the past, no readily usable and reliable apparatus has been known for accomplishing this end.

An object of my invention is to provide a new and improved device of simple and inexpensive construction and operation for restraining movement of chuck and collet jaws during turning of such soft jaws to a predetermined size for holding a workpiece.

Another object of my invention is the provision of a novel device which is readily and easily applicable to and reusable with soft jaws of lathe chucks, collets and the like for restraining movement of such jaws while being turned to a proper size for snugly holding a workpiece.

These and other objects and advantages of my invention will more fully appear from the following description made in connection with the accompanying drawings wherein like reference characters refer to similar parts throughout the several views and in which.

Figure 1:
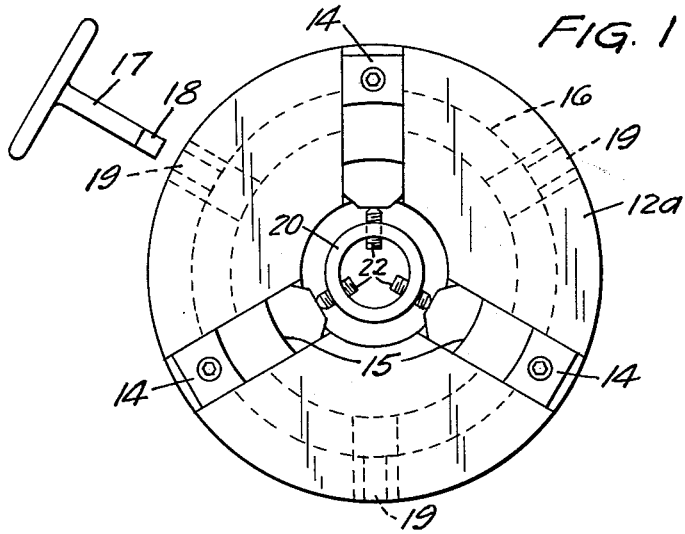
FIG. 1 is a front elevation view.

One form of the invention is shown in the drawings and is described herein.

Figure 2:
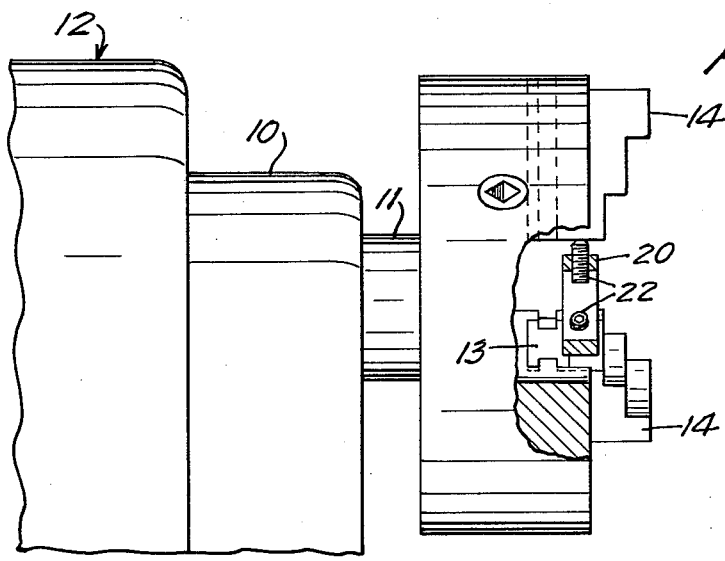
FIG. 2 is a detail side elevation view with portions broken away for clarity of detail.
Figure 3:
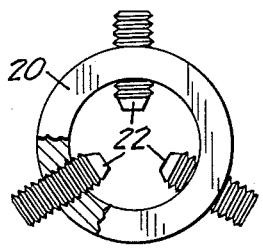
FIG. 3 is an enlarged detail elevation view partly shown in section for clarity of detail.
Figure 4:
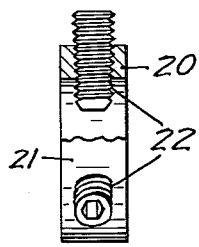
FIG. 4 is an enlarged detail side elevation view partly shown in section for clarity of detail.

In FIG. 2 is a portion of the drive housing 10 and drive shaft 11 of a lathe 12. The shaft 11 has a lathe chuck 12a of substantially conventional design affixed on the shaft 11. The chuck 12a has a plurality of jaw mountings 13 extending radially and movable radially toward and away from the rotation axis of the chuck and mounting the soft jaws 14 which are of a material which is readily and easily milled or machined such as mild steel. Soft jaws 14 are conventionally reusable, but in order to reuse the soft jaws with a succession of work pieces, the jaw faces 15 thereof require additional machining or turning down to the proper size to fit the exterior configuration of the workpiece. The soft jaws 14 are suitably affixed to the mountings 13 and are movable radially therewith. The radial inward and outward movement of mountings 13 and soft jaws 14 is controlled by a gearing mechanism, indicated by numeral 16 which is substantially conventional in all chucks 12a and is controlled by a hand wrench 17 which has a squared end 18 thereon for fitting in the wrench-receiving socket 19 which actually turns the gearing mechanism 16, thereby producing inward and outward sliding movement of the mounting 13 and soft jaws 14.

It will be seen that a removable rigid element or ring 20 is disposed between the soft jaws 14 and substantially concentric of the rotation axis with the outer peripheral cylindrical surface 21 in spaced and confronting relation with the inner portion of each of the soft jaws 14. The rigid ring 20 has a multiplicity of elongate and rigid set screws or lugs 22 threaded therethrough and projecting radially outwardly from the outer cylindrical surface 21. Each of the threaded projections 22 engages a respective soft jaw 14 and prevents radial inward movement of the corresponding soft jaws and cooperates with the other threaded projections 22 in preventing radial inward movement of any of the soft jaws 14.

It will be understood that by inserting the wrench 17 into the socket 19, the soft jaws 14 may be moved radially inwardly and clamped tightly against the threaded projections 22 which are radially adjusted to a desired position so as to orient one of the jaw faces 15 at approximately the desired position with respect to the rotation axis and thereby permit turning or machining of the jaw face to the proper diameter which corresponds to the exterior diameter of the workpiece to be subsequently handled by the soft jaws. The conventional gearing mechanism 16 will prevent radial outward movement of the soft jaws 14 and mountings 13 thereof, and the inner engagement of the several threaded projections 22 with the several soft jaws prevents any inward movement of the soft jaws during the turning or machining operation and thereby causes the soft jaws to be held in a fixed and steady position so that they may be accurately machined or turned to the proper configuration at their jaw faces.

It will be understood that the ring 20 with the threaded projections may be used with a workpiece-holding collet of the type used in a lathe for holding a workpiece. It will be understood that during the machining operation of the soft jaws on a collet, the ring 20 together with the threaded projections 22 restrain inward movement of the soft jaws of the collet while additional mechanism surrounding the outside of the collet will restrain outward movement of the soft jaws, thereby permitting accurate machining of the jaw faces.

It will, of course, be understood that various changes may be made in the form, detail, arrangement and proportion of the parts without departing from the scope of my invention which consists of the matter described herein and set forth in the appended claims.

What is claimed is:
1. Apparatus for use while turning soft jaws to a desired size,
  comprising means mounting a multiplicity of soft jaws at arcuately spaced positions around a rotation axis and adapted to be rotated about said axis,
  means selectively restraining said soft jaws for radially outward movement,
  and a rigid ring between the soft jaws and substantially concentric of the rotation axis and having a multiplicity of radially extending and radially adjustable projections secured on the ring and bearing radially outwardly against said soft jaws and preventing inward movement thereof, whereby to restrain radial movement of the jaws during rotation and turning thereof to size.

2. Apparatus for use while turning soft jaws to a desired size,
  comprising means mounting a multiplicity of soft jaws at arcuately spaced positions around a rotation axis and adapted to be turned about said axis,
  means selectively restraining said soft jaws for radially outward movement,
  and a rigid cylindrical element disposed between the soft jaws and substantially concentric of the rotation axis and having a multiplicity of radially extending and radially adjustable projections secured on the element and bearing radially outwardly against said soft jaws and preventing inward movement thereof, whereby to restrain radial movement of the jaws during rotation and turning thereof to size.

3. Apparatus for use while turning soft jaws to a desired size, comprising means mounting a multiplicity of soft jaws at arcuately spaced positions around a rotation axis and adapted to be rotated about said axis, means selectively restraining said soft jaws for radially outward movement, and a rigid ring disposed between said soft jaws and substantially concentric of the rotation axis and having a multiplicity of rigid and radially extending lugs threadably secured in the ring and in arcuately spaced relation with respect to each other around said axis, said lugs being radially adjustable and bearing radially outwardly against said soft jaws and preventing inward movement thereof, whereby to restrain radial movement of the jaws during rotation and turning thereof to size.

4. In combination with a lathe chuck having soft collet jaws, a device against which the collet soft jaws may be clamped during turning of the jaws to the desired size, comprising a rigid and circular element to be disposed between such jaws having an outer peripheral surface to confront such jaws in spaced relation, and a plurality of elongate and rigid lugs projecting radially from said surface and being threadably mounted in said element for individual radial adjustment and for engagement with the jaws to prevent inward movement thereof toward said element.

5. Apparatus for use while turning soft jaws to a desired size, comprising a lathe chuck having a plurality of angularly disposed soft jaws, a gear mechanism for collectively moving all of said soft jaws radially inwardly and outwardly, a rigid cylindrical element, a plurality of individually adjustable screw members equal in number to said soft jaws threadably carried on said cylindrical element at angular locations corresponding to those of said soft jaws and providing ends residing outwardly of said cylindrical element for restraining inward radial movement of said soft jaws during rotation and turning thereof to size.

6. Apparatus in accordance with claim 5 in which each of said screw members is formed with a socket at the end thereof residing inwardly of said cylindrical element.

References Cited by the Examiner
UNITED STATES PATENTS

| | | | |
|---|---|---|---|
| 656,406 | 8/00 | Hopkins | 33—191 |
| 2,572,013 | 10/51 | Cushman | 33—181 |
| 2,809,044 | 10/57 | Landreth | 82—45 X |

WILLIAM W. DYER, Jr., *Primary Examiner.*